United States Patent
Dubeyko (10) Patent No.: US 11,907,564 B2
(45) Date of Patent: Feb. 20, 2024

(54) METHOD OF AND SYSTEM FOR INITIATING GARBAGE COLLECTION REQUESTS

(71) Applicant: YADRO INTERNATIONAL LTD., Nicosia (CY)

(72) Inventor: Viacheslav Dubeyko, Azov (RU)

(73) Assignee: YADRO INTERNATIONAL LTD., Paphos (CY)

( * ) Notice: Subject to any disclaimer, the term of this patent is extended or adjusted under 35 U.S.C. 154(b) by 0 days.

(21) Appl. No.: 17/393,183

(22) Filed: Aug. 3, 2021

(65) Prior Publication Data

US 2023/0038680 A1 Feb. 9, 2023

(51) Int. Cl.
G06F 3/06 (2006.01)

(52) U.S. Cl.
CPC .......... G06F 3/0652 (2013.01); G06F 3/0608 (2013.01); G06F 3/0611 (2013.01); G06F 3/0653 (2013.01); G06F 3/0679 (2013.01)

(58) Field of Classification Search
CPC .... G06F 3/0652; G06F 3/0608; G06F 3/0611; G06F 3/0653; G06F 3/0679
See application file for complete search history.

(56) References Cited

U.S. PATENT DOCUMENTS

| | | | | |
|---|---|---|---|---|
| 7,610,437 B2* | 10/2009 | Sinclair | ............... | G06F 3/0652 |
| | | | | 711/104 |
| 7,984,084 B2* | 7/2011 | Sinclair | ............... | G06F 16/1847 |
| | | | | 707/818 |
| 8,285,918 B2* | 10/2012 | Maheshwari | ....... | G06F 12/0891 |
| | | | | 711/159 |
| 8,443,263 B2* | 5/2013 | Selinger | ............... | G06F 11/1068 |
| | | | | 714/768 |
| 8,873,284 B2* | 10/2014 | Sinclair | ............... | G06F 12/0246 |
| | | | | 365/185.11 |
| 9,223,693 B2* | 12/2015 | Sinclair | ............... | G06F 12/0246 |
| 9,336,133 B2* | 5/2016 | Sinclair | ............... | G06F 12/0246 |

(Continued)

FOREIGN PATENT DOCUMENTS

| | | | |
|---|---|---|---|
| CN | 105528301 A | | 4/2016 |
| CN | 109739775 A | | 5/2019 |

(Continued)

OTHER PUBLICATIONS

English Abstract for CN105528301 retrieved on Espacenet on Aug. 3, 2021.

(Continued)

*Primary Examiner* — Christopher D Birkhimer
(74) *Attorney, Agent, or Firm* — BCF LLP (57) ABSTRACT

A method and system for initiating a garbage collection request. Historical data representative of a level of initiated I/O requests is acquired. A first operational state and a second operational state are determined based on the historical data. The first operational state and second operational state are expressed in an indication of the level of initiated I/O requests to be processed. A number of currently initiated I/O requests is acquired. A determination is made as to whether the number of currently initiated I/O requests is indicative of the first operational state or the second operational state. If the computer system is in the first operational state, the garbage collection request is initiated.

12 Claims, 7 Drawing Sheets

(56) References Cited

U.S. PATENT DOCUMENTS

| | | | |
|---|---|---|---|
| 9,348,746 B2* | 5/2016 | Sinclair | G06F 12/0246 |
| 9,465,731 B2* | 10/2016 | Sinclair | G06F 3/0688 |
| 9,652,382 B1 | 5/2017 | Subramanian et al. | |
| 9,734,050 B2* | 8/2017 | Sinclair | G06F 12/0253 |
| 9,734,911 B2* | 8/2017 | Sinclair | G06F 3/0658 |
| 9,778,855 B2* | 10/2017 | Sinclair | G06F 3/064 |
| 10,108,543 B1* | 10/2018 | Duggal | G06F 11/1453 |
| 10,108,544 B1* | 10/2018 | Duggal | G06F 11/14 |
| 10,120,613 B2* | 11/2018 | Sinclair | G06F 12/02 |
| 10,133,490 B2* | 11/2018 | Sinclair | G06F 3/0655 |
| 10,255,179 B2* | 4/2019 | Ji | G06F 3/0659 |
| 10,430,279 B1* | 10/2019 | Dittia | G06F 3/0656 |
| 10,795,812 B1* | 10/2020 | Duggal | G06F 3/067 |
| 10,983,715 B2 | 4/2021 | Sharoni | G06F 21/10 |
| 11,086,537 B2* | 8/2021 | Byun | G06F 3/0679 |
| 2007/0005882 A1 | 1/2007 | Gallagher et al. | |
| 2007/0033325 A1* | 2/2007 | Sinclair | G06F 3/0608 711/170 |
| 2008/0082596 A1* | 4/2008 | Gorobets | G06F 12/0253 |
| 2008/0189477 A1* | 8/2008 | Asano | G06F 12/0246 711/E12.008 |
| 2011/0145473 A1* | 6/2011 | Maheshwari | G06F 12/0873 711/E12.008 |
| 2011/0161784 A1* | 6/2011 | Selinger | G06F 11/1016 714/E11.002 |
| 2012/0011301 A1 | 1/2012 | Goss et al. | |
| 2014/0325148 A1* | 10/2014 | Choi | G06F 3/0659 711/114 |
| 2014/0365719 A1* | 12/2014 | Kuzmin | G06F 12/0246 711/103 |
| 2015/0032939 A1 | 1/2015 | Gao et al. | |
| 2015/0227602 A1* | 8/2015 | Ramu | G06F 11/1456 707/634 |
| 2016/0246713 A1* | 8/2016 | Choi | G06F 3/0608 |
| 2017/0060445 A1* | 3/2017 | Yang | G11C 17/18 |
| 2017/0123655 A1* | 5/2017 | Sinclair | G06F 3/061 |
| 2017/0300410 A1 | 10/2017 | Zhang et al. | |
| 2017/0308398 A1 | 10/2017 | Pinto et al. | |
| 2018/0189175 A1* | 7/2018 | Ji | G06F 3/0679 |
| 2018/0210825 A1 | 7/2018 | Gim et al. | |
| 2019/0073297 A1 | 3/2019 | Goss et al. | |
| 2020/0089420 A1* | 3/2020 | Sharoni | G06F 3/0637 |
| 2020/0174921 A1* | 6/2020 | Lee | G06F 3/0652 |
| 2020/0310686 A1* | 10/2020 | Truong | G06F 3/067 |

FOREIGN PATENT DOCUMENTS

| | | |
|---|---|---|
| EP | 3350703 A1 | 7/2018 |
| JP | H1011337 A | 1/1998 |
| WO | 2017069646 A1 | 4/2017 |

OTHER PUBLICATIONS

English Abstract for JPH1011337 retrieved on Espacenet on Aug. 3, 2021.

English Abstract for CN109739775 retrieved on Espacenet on Aug. 3, 2021.

Dubeyko, "SSDFS: Towards LFS Flash-Friendly File System without GC operations", arXiv:1907.11825v1 [cs.OS] Jul. 27, 2019, p.p. 1-52.

* cited by examiner

METHOD OF AND SYSTEM FOR INITIATING GARBAGE COLLECTION REQUESTS

FIELD

The present technology relates to managing garbage collection requests and, more specifically, to a method of and a system for determining whether to initiate a garbage collection request to be processed by a computer system.

BACKGROUND

Garbage collection may be used to manage storage on certain types of file systems storing data on storage devices, such as file systems using segment-based organization. Flash memory, such as NAND memory, may comprise blocks having multiple pages. The individual pages may store data. After a page has been written, that page might not be able to be altered without erasing the entire block containing the page.

The data stored on a page may become obsolete. A page may be valid when the data stored on the page is current. A page may be obsolete when the data stored on the page is obsolete and the page is not available to be written to. A page may be free when the page is available to be written to. A block may contain valid pages, obsolete pages and/or free pages. A file system may track which blocks are valid, invalid, and/or clean.

Garbage collection may be performed in order to generate blocks in a storage device that are clean and available to be written to, prolong the lifetime of the storage device, improve the performance of a filesystem using the storage device, and/or improve the performance of the storage device. Garbage collection may consolidate valid pages from valid blocks containing both valid pages and obsolete pages into clean blocks. After consolidating the valid pages into the clean blocks, the clean blocks will become valid blocks. The blocks that were previously valid blocks might now contain obsolete pages, and those blocks may be clean and available to be written to.

Garbage collection may be performed by adding input/output (I/O) requests to the I/O request queue. These requests may add overhead and/or degrade the storage system's performance. It may be preferable to reduce the impact of garbage collection on storage system performance.

SUMMARY

Developers of the present technology have appreciated at least one technical problem associated with the prior art approaches.

The present technology relates to managing garbage collection, and more specifically to a method of and a system for determining whether to initiate a garbage collection request to be processed by a computer system. Garbage collection may be performed to consolidate valid pages and/or maintain an amount of blocks that contain both valid pages and obsolete pages under a pre-defined threshold. Increasing the amount of garbage collection operations performed may increase the number of clean blocks that are available to be written to. But garbage collection may add overhead to a storage system by causing additional I/O requests to be performed by the storage system.

In accordance with the non-limiting embodiments of the present technology, the number of initiated I/O requests and the number of processed I/O requests for a storage system may be recorded over a period of time. The number of initiated I/O requests may be the number of I/O requests in an I/O request queue associated with the storage system. The number of initiated I/O requests might not include a count of garbage collection I/O requests. The number of processed I/O requests may be the number of I/O requests that were completed by the system during a specified period of time.

A maximal number and/or minimal number of processed I/O requests may be determined using the recorded data. The maximal number may be used as an indicator of a highest load that the storage system is able to process. Various states of the storage system may be defined, such as an idle state, normal state, and/or high-load state. Threshold amounts of initiated and/or processed I/O requests may be determined for each of the states of the storage system.

Based on the state of the storage system, a determination may be made as to whether garbage collection should be performed. For example if the storage system is in the idle state, garbage collection may be performed, whereas if the storage system is in the high-load state, garbage collection might not be performed.

The number of garbage collection I/O requests to initiate may be determined based on a difference between the current number of initiated I/O requests and the threshold corresponding to the normal state. After determining the number of garbage collection I/O requests to initiate, the garbage collection I/O requests may be initiated.

According to a first broad aspect of the present technology, there is provided a method for determining whether to initiate a garbage collection request to be processed by a computer system, the method executable by an electronic device associated with the computer system, the method comprising: acquiring historical data representative of a level of initiated I/O requests to be processed by the computer system over a pre-determined period of time; based on the historical data, determining a first operational state and a second operational state of operation of the computer system, the first operational state and the second operational state being expressed in a respective indication of the level of initiated I/O requests to be processed by the computer system; acquiring a number of currently initiated I/O requests to be processed by the computer system; determining whether the number of currently initiated I/O requests to be processed by the computer system is indicative of the first operational state or the second operational state of the computer system; and in response to the computer system being in the first operational state, initiating the garbage collection request.

In some implementations of the method, the method further comprises determining a trend in the number of currently initiated I/O requests to be processed by the computer system.

In some implementations of the method, the method further comprises determining whether to initiate the garbage collection requests based on: whether the number of initiated I/O requests is increasing or decreasing compared to a previously recorded number of initiated I/O requests. whether the number of processed I/O requests is increasing or decreasing compared to a previously recorded number of processed requests.

In some implementations of the method, the method further comprises: determining, based on an average amount of I/O requests to be processed by the computer system, an upper bound number of I/O requests corresponding to the normal state; and determining, based on a difference between the upper bound and the number of processed I/O requests, an amount of garbage collection requests to initiate.

In some implementations of the method, the first operational state is indicative of a lower number of I/O requests to be processed by the computer system compared to the second operational state.

In some implementations of the method, the first operational state comprises an idle operational state and the second operational state comprises a high-load state.

In some implementations of the method, the historical data excludes garbage collection requests.

In some implementations of the method, in response to the computer system being in the second operational state, the method further comprises not initiating the garbage collection request.

In some implementations of the method, the computer system comprises at least one computer sub-system, the at least one sub-system being one of an SSD, FTL, and a file system.

In some implementations of the method, the method further comprises: determining, based on the level of initiated I/O requests to be processed by the computer system: an idle threshold, a normal operational threshold, and a high-load threshold; and wherein the first operational state encompasses the idle threshold and the normal operational threshold; and the second operational state encompasses the high-load threshold.

In some implementations of the method, the garbage collection request is for erasing at least one pre-determined NAND flash erase block of the computer system.

In some implementations of the method, the method further comprises: applying a pre-determined algorithm for identifying the at least one pre-determined NAND flash erase block.

According to another broad aspect of the present technology, there is provided a system comprising: at least one processor, and memory storing a plurality of executable instructions which, when executed by the at least one processor, cause the system to: acquire historical data representative of a level of initiated I/O requests to be processed by the system over a pre-determined period of time; based on the historical data, determine a first operational state and a second operational state of operation of the system, the first operational state and the second operational state being expressed in a respective indication of the level of initiated I/O requests to be processed by the system; acquire a number of currently initiated I/O requests to be processed by the system; determine whether the number of currently initiated I/O requests to be processed by the system is indicative of the first operational state or the second operational state of the system; and in response to the system being in the first operational state, initiating one or more garbage collection I/O requests.

In some implementations of the system, the instructions cause the system to determine a trend in the number of currently initiated I/O requests to be processed by the system.

In some implementations of the system, the instructions cause the system to determine whether to initiate the one or more garbage collection requests based on: whether the number of initiated I/O requests is increasing or decreasing compared to a previously recorded number of initiated I/O requests; and whether the number of processed I/O requests is increasing or decreasing compared to a previously recorded number of processed requests.

In some implementations of the system, the instructions cause the system to: determine, based on an average amount of I/O requests to be processed by the system, an upper bound number of I/O requests corresponding to the normal state; and determine, based on a difference between the upper bound and the number of initiated I/O requests, an amount of garbage collection requests to initiate.

In some implementations of the system, the first operational state is indicative of a lower number of I/O requests to be processed by the system compared to the second operational state.

In some implementations of the system, the first operational state comprises an idle operational state and the second operational state comprises a high-load state.

In some implementations of the system, the historical data excludes garbage collection I/O requests.

In some implementations of the system, the one or more garbage collection requests comprise an instruction to erase at least one pre-determined NAND flash block of the system.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server."

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drives, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first," "second," "third," etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Figure 1:
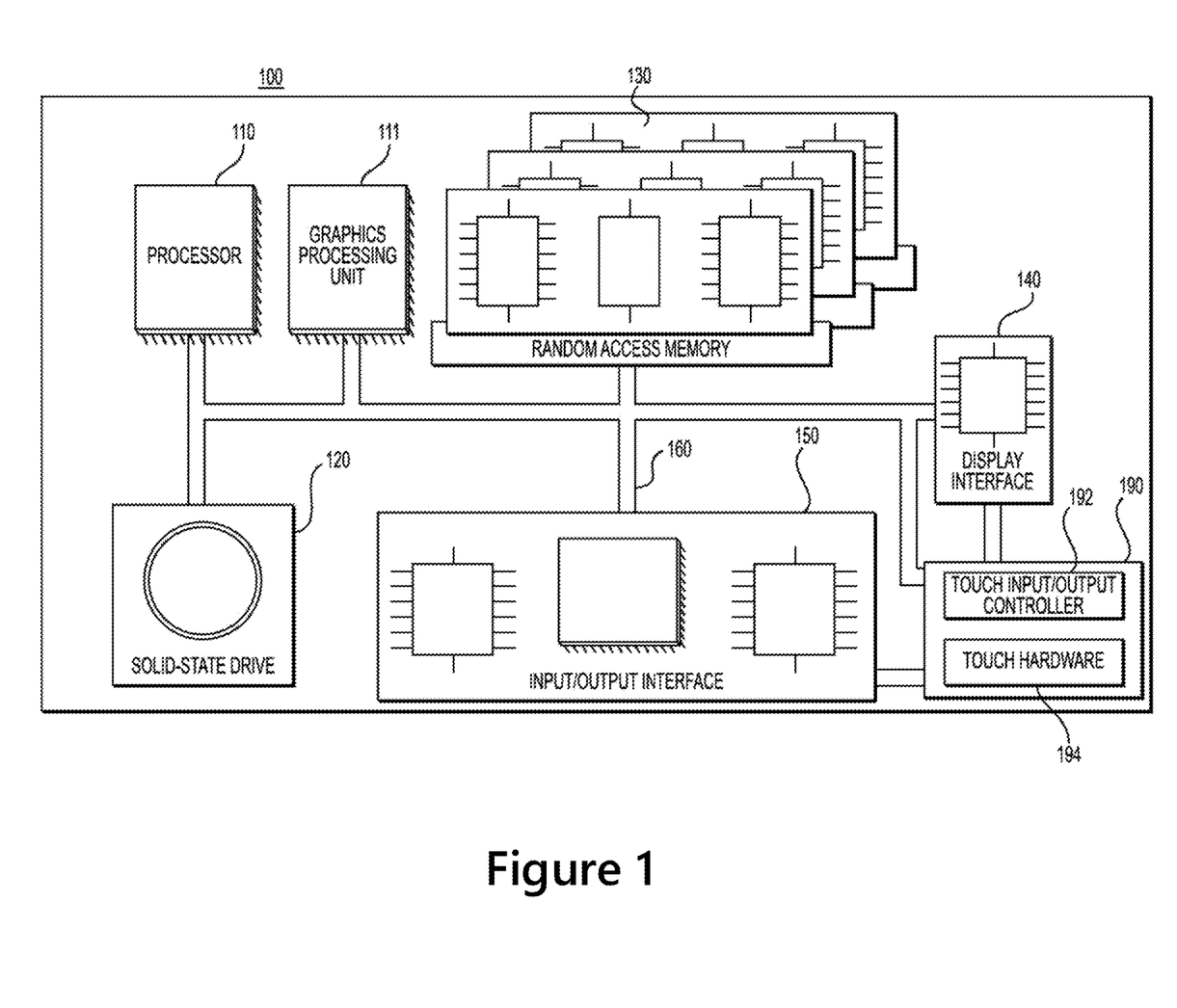
FIG. 1 is an illustration of components and features of a computing device in accordance with non-limiting embodiments of the present technology.

With reference to FIG. 1, there is shown a computing device 100 suitable for use with some implementations of the present technology. The computing device 100 comprises various hardware components including one or more single or multi-core processors collectively represented by processor 110, a graphics processing unit (GPU) 111, a solid-state drive 120, a random access memory 130, a display interface 140, and an input/output interface 150.

Communication between the various components of the computing device 100 may be enabled by one or more internal and/or external buses 160 (e.g. a peripheral component interconnect (PCI) bus, universal serial bus, Institute of Electrical and Electronics Engineers (IEEE) 1394 "Firewire" bus, small computer system interface (SCSI) bus, serial advanced technology attachment (SATA) bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computing device 100 in addition to or instead of the touchscreen 190.

According to implementations of the present technology, the solid-state drive 120 stores program instructions suitable for being loaded into the random access memory 130 and executed by the processor 110 and/or the GPU 111. For example, the program instructions may be part of a library or an application. The solid-state drive 120 may include flash memory, such as NAND flash memory. The solid-state drive 120 may include and/or be managed by a flash translation layer (FTL). The FTL may manage operations of the solid-state drive 120. The solid-state drive may include one or more file systems, such as a new technology file system (NTFS), file allocation table (FAT) based file system, and/or any other type of file system. The file systems may be log-structured file systems that are divided into segments.

The solid-state drive 120 may be organized into blocks having multiple pages. An individual page might not be able to be erased without erasing the entire block containing the page. As described in further detail below, garbage collection may be performed in order to optimize storage on the solid-state drive 120, create clean blocks that are available to be written to on the solid-state drive 120, and/or otherwise improve performance and/or capacity of the solid-state drive 120.

Although a single solid-state drive 120 is illustrated, the computing device 100 may include multiple solid-state drives 120 and/or any other types of storage devices. In addition to, or instead of, the solid-state drive 120 the computing device 100 may include one or more shingled magnetic recording hard drives (SMR HDDs). An SMR HDD may include zones having multiple sectors. To write a single sector on an SMR HDD, the entire zone might be re-written. Garbage collection may be performed to optimize storage on the SMR HDD. A controller of the SMR HDD may manage storage operations and/or garbage collection on the SMR HDD. The file systems used by the computing device 100 may incorporate multiple storage devices and/or multiple types of storage devices.

The computing device 100 may be a server, a desktop computer, a laptop computer, a tablet, a smartphone, a personal digital assistant, a storage system, or any device that may be configured to implement the present technology, as should be understood by a person skilled in the art.

Storage Blocks and Pages

Figure 2:
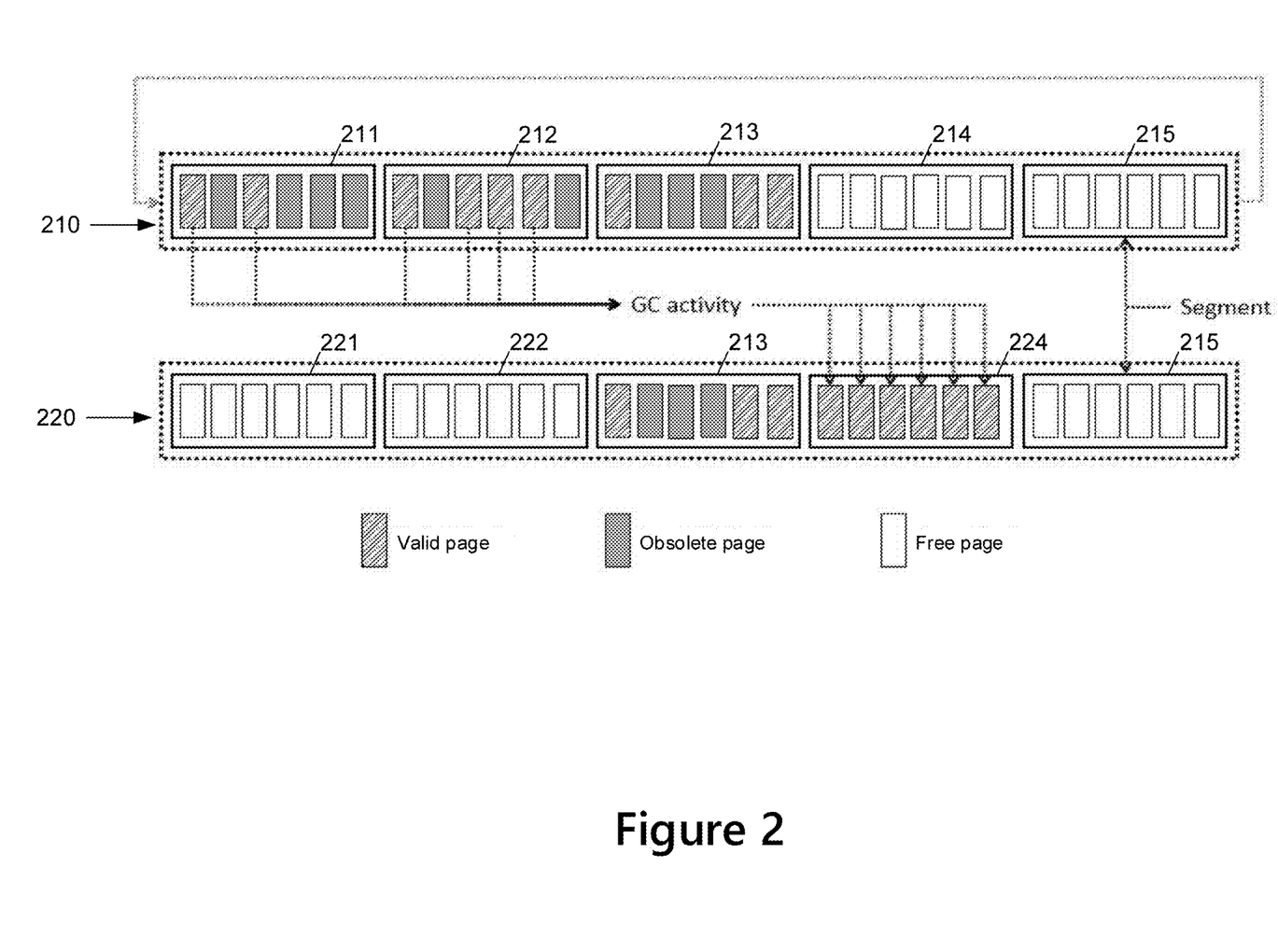
FIG. 2 depicts a diagram of storage blocks implemented in accordance with non-limiting embodiments of the present technology.

With reference to FIG. 2 there is depicted a diagram of storage blocks implemented in accordance with non-limiting embodiments of the present technology. FIG. 2 includes a first set of blocks 210 having five blocks 211, 212, 213, 214, and 215. Each of the blocks 211-15 includes six pages, which are indicated by shading as either valid, obsolete, or free. A file system managing the storage blocks may maintain records of which pages are valid, obsolete, and/or free.

Valid pages may be pages that are written with data that is currently valid and may be used by the file system. A valid page may contain the actual and last state of the data written to the page. Obsolete pages may have been previously written and used by the file system but are no longer being used by the file system. For example a first page may be written, and then the data stored on the first page may be updated. In order to update the data stored on the first page, a second page may be written that includes the updated version of the data stored on the first page. After the second page is written, the first page may be recorded as an obsolete page in a metadata structure because the data stored on the first page is now obsolete and should no longer be used by the file system, except as a snapshot of a previous state of the data. The second page may be recorded as a valid page in the metadata structure. Free pages may be clean pages that have not yet had data written to them and/or pages that were previously obsolete and are now available to be written to. The free pages may be available to be written to.

Obsolete pages may contain obsolete data. This data may still be used as it contains a previous state of the data stored on that page. But there is a valid page that contains the current valid version of the same data. For example if the valid page were to become inaccessible, such as due to a hardware failure, the obsolete page containing the previous state of the data stored on the inaccessible page may be accessed.

A single obsolete page might not be re-written without erasing the entire block that includes the obsolete page. In order to prepare the obsolete page to be written to, or in other words in order to convert the obsolete page into a free page, a garbage collection I/O request may be initiated that includes an instruction to erase the entire block containing the obsolete page. For example in order to prepare one of the obsolete pages in the block 211 to be written to, the entire block 211 might be erased. After erasing the block 211, each of the pages in the block 211 may become free pages. Because the block 211 includes two valid pages, those valid pages may be copied and/or moved to a different block prior to erasing the block 211. Otherwise, if the block 211 were erased without copying the valid pages on the block 211, the content of those valid pages may be lost. After copying and/or moving the valid pages to a different block, the file system may update a reference corresponding to the valid pages that previously pointed to the block 211 to now point to the different block that contains the valid pages that were previously stored on the block 211.

The set of blocks 220 contains five blocks 221, 222, 223, 224, and 225. The set of blocks 220 illustrates an example of the set of blocks 210 after performing garbage collection on the set of blocks 210. The valid pages from the blocks 211 and 212 may be consolidated into a single block 224. The blocks 211 and 212 may then be erased, which results in the clean blocks 221 and 222. The blocks 213 and 215 remain unchanged. The file system may update the references for the valid pages from the blocks 211 and 212 so that they now point to the block 224.

The set of blocks 210 and 220 each contain the same amount of valid pages. But in the set of blocks 210 there are only two clean blocks that can be written to (214 and 215), whereas in the set of blocks 220 there are three clean blocks (221, 222, and 215). By performing garbage collection on the set of blocks 210, the amount of blocks that are clean and available to be written to may be increased as can be seen in the set of storage blocks 220.

Garbage Collection Activity

Figure 3:
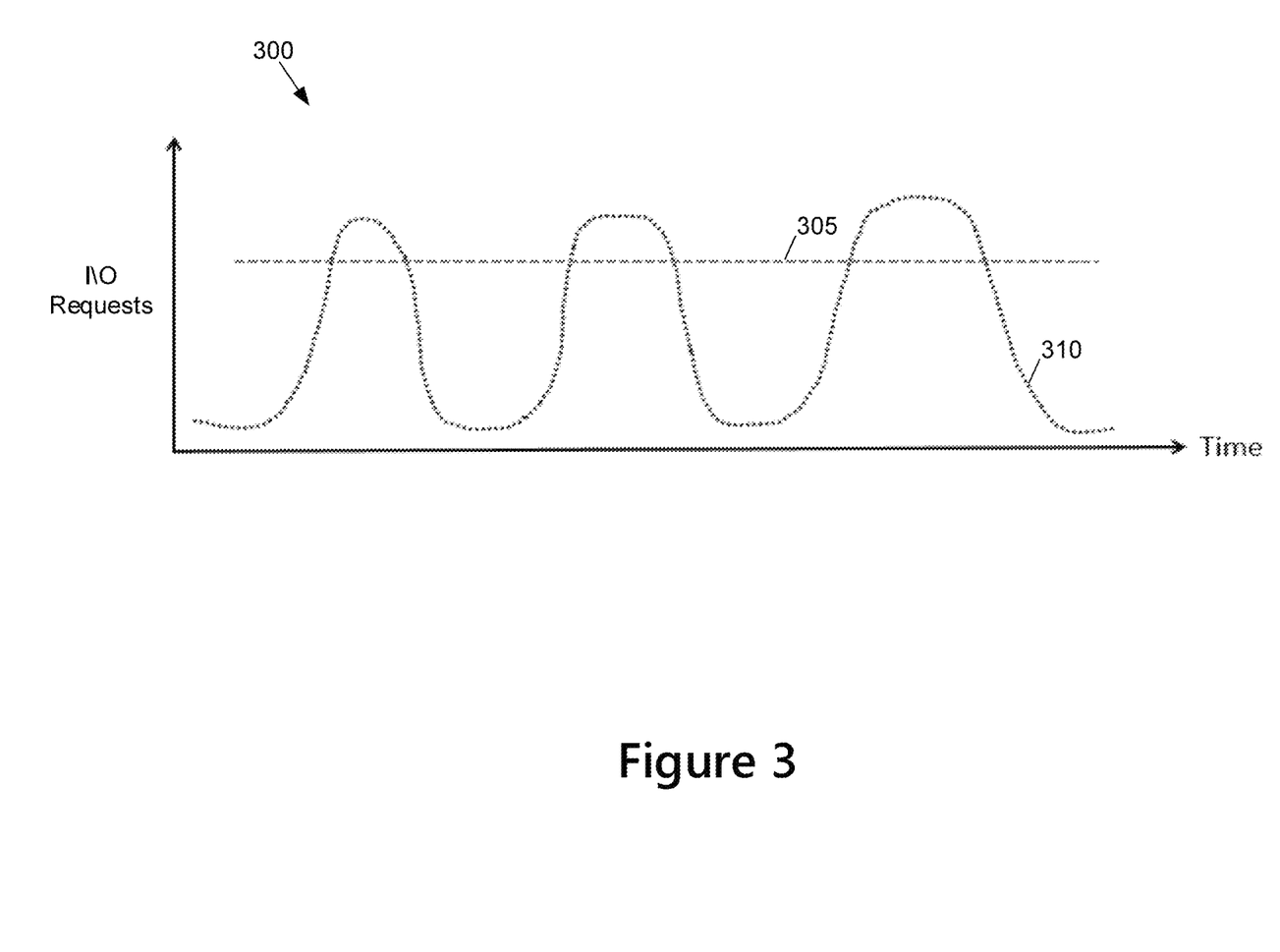
FIG. 3 depicts a graph of storage system processes in accordance with non-limiting embodiments of the present technology.

With reference to FIG. 3 there is depicted a graph 300 of storage system processes implemented in accordance with non-limiting embodiments of the present technology. The graph 300 illustrates a number of I/O requests being initiated for a storage system. The line 310 illustrates normal I/O requests for the storage system. The normal I/O requests may include all I/O requests other than garbage collection I/O requests. As can be seen, over time the amount of normal I/O requests increases and decreases. For example the number of normal I/O requests may increase when a user is storing data to the storage system. The number of normal I/O requests may be lower when the storage system is not being used.

The line 305 illustrates garbage collection I/O requests. Garbage collection may be performed at a relatively constant rate, in which case the number of garbage collection I/O requests may remain consistent over time. During the periods of increased normal I/O activity illustrated by the line 310, the garbage collection I/O requests illustrated by the line 305 may interfere with the normal I/O activity and decrease the efficiency of the storage system. In accordance with the non-limiting embodiments of the present technology, the number of garbage collection I/O requests can be increased and/or decreased in response to changes in the number of normal I/O requests for the storage system.

Optimized Garbage Collection Activity

Figure 4:
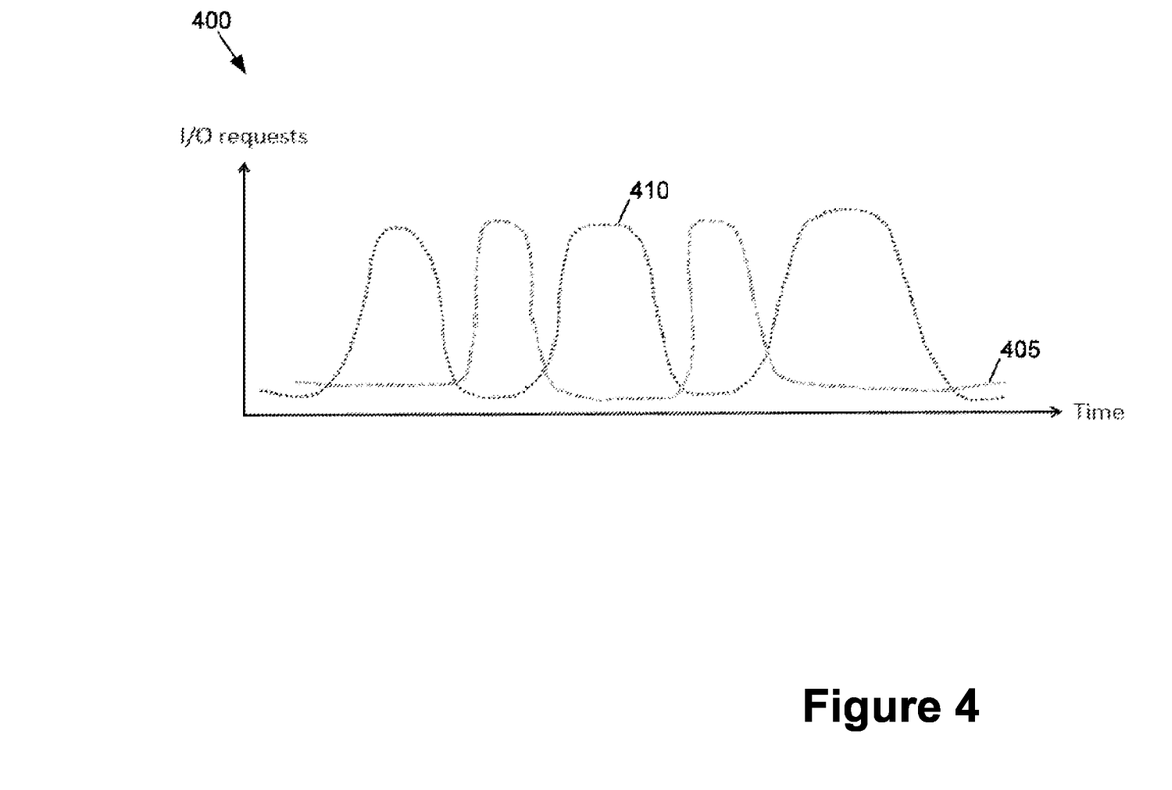
FIG. 4 depicts a graph of optimized garbage collection in accordance with non-limiting embodiments of the present technology.

With reference to FIG. 4 there is depicted a graph 400 of optimized garbage collection in accordance with non-limiting embodiments of the present technology. In contrast to the graph 300, the graph 400 illustrates garbage collection that is dynamically adjusted based on the number of normal I/O requests that are in the storage system's queue.

The line 410 illustrates normal I/O requests for the storage system. As can be seen, the amount of normal I/O requests increase and decrease over time. In order to optimize the performance of the storage system, the number of I/O requests initiated for garbage collection (referred to herein as garbage collection I/O requests) may be dynamically adjusted based on the normal I/O requests.

The line 405 illustrates the number of garbage collection I/O requests that are optimized based on the number of normal I/O requests. As the number of normal I/O requests increases (illustrated by the line 410) the number of garbage collection I/O requests decreases (illustrated by the line 405). Conversely, when the number of normal I/O requests is low and the storage system has capacity for additional I/O requests, the number of garbage collection I/O requests is increased. The method 600, described below with regard to FIG. 6, describes a method of adjusting the number of garbage collection I/O requests in response to the number of pending normal I/O requests.

Initiated and Processed I/O Requests

Figure 5:
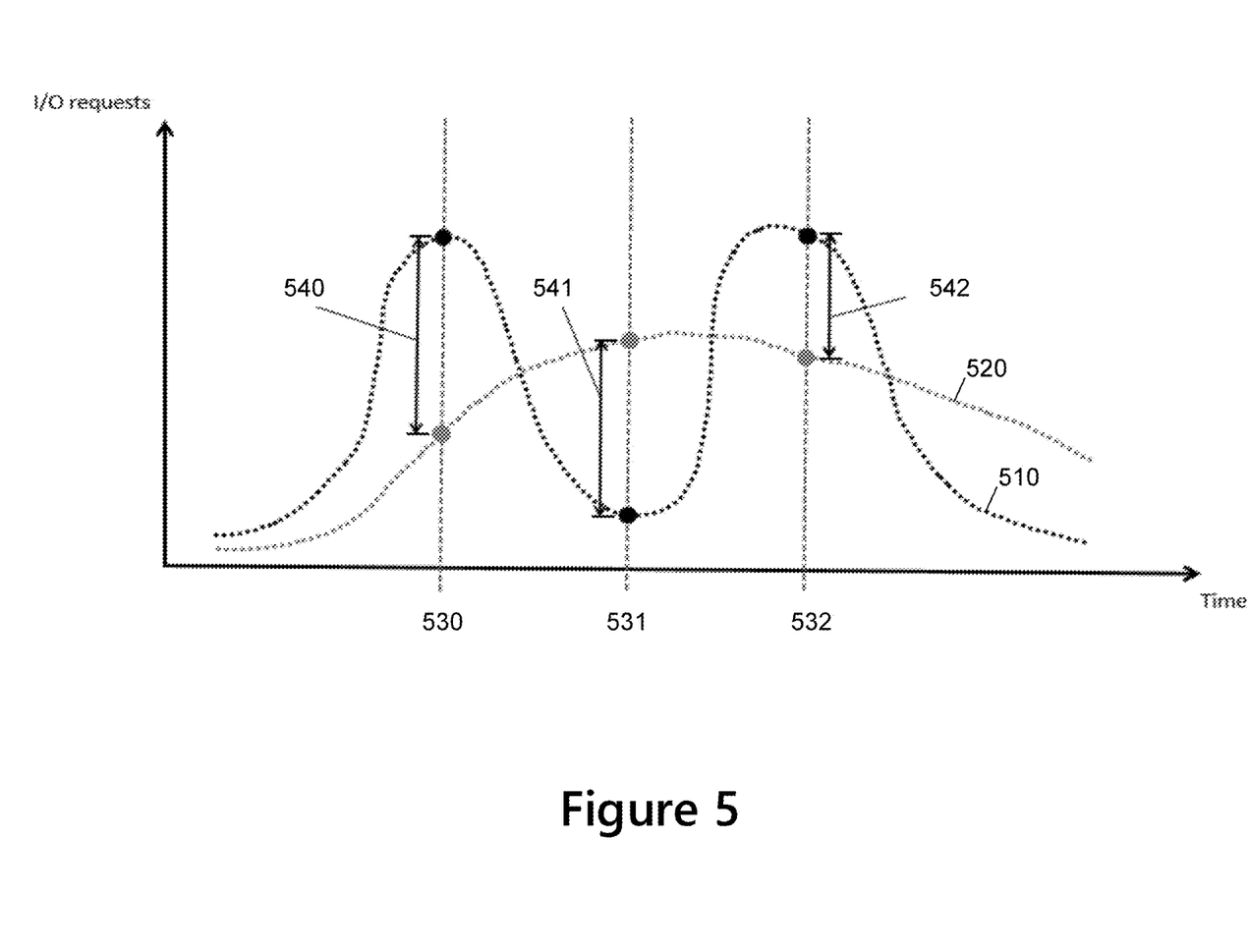
FIG. 5 depicts a graph of I/O requests in accordance with non-limiting embodiments of the present technology.

With reference to FIG. 5 there is depicted a graph 500 of I/O requests in accordance with non-limiting embodiments of the present technology. The graph 500 includes a line 510 indicating a current number of initiated I/O requests and a line 520 indicating a current number of processed I/O requests. The number of initiated I/O requests may be the number of I/O requests pending in a queue for the storage system, but might not include garbage collection I/O requests. The I/O requests in the queue may include normal I/O requests and/or garbage collection I/O requests. To determine the number of I/O requests in the queue without including garbage collection I/O requests, the number of initiated I/O requests may be determined by the file system. The file system may count the number of I/O requests that the file system sends to the I/O requests queue. This count may be the number of initiated I/O requests. The number of initiated I/O requests and/or processed I/O requests may be recorded at various time periods, such as a time 530, time 531, and time 532. The number of processed I/O requests may be measured over a period of time, such as the number of I/O requests that were processed in the last thirty seconds or the like.

At each of the times 530, 531, and 532 a difference 540, 541, and 542 may be determined between the number of initiated I/O requests and the number of processed I/O requests. Similarly, a determination may be made as to whether the number of initiated I/O requests and/or processed I/O requests is increasing or decreasing at each of the times 531, 531, and 532. Alternatively, at each of the times 530, 531, and 532 an absolute number of the initiated I/O requests can be determined.

At the time 530 the number of initiated I/O requests is increasing and the number of processed I/O requests is increasing. At the time 531 the number of processed I/O requests is increasing and the number of initiated I/O requests is decreasing. At the time 532 the number of initiated I/O requests is decreasing and the number of processed I/O requests is decreasing. These determined values may be used to determine whether to initiate garbage collection and, if so, how many garbage collection I/O requests to initiate.

Method (Non-Limiting Embodiment)

Figure 6:
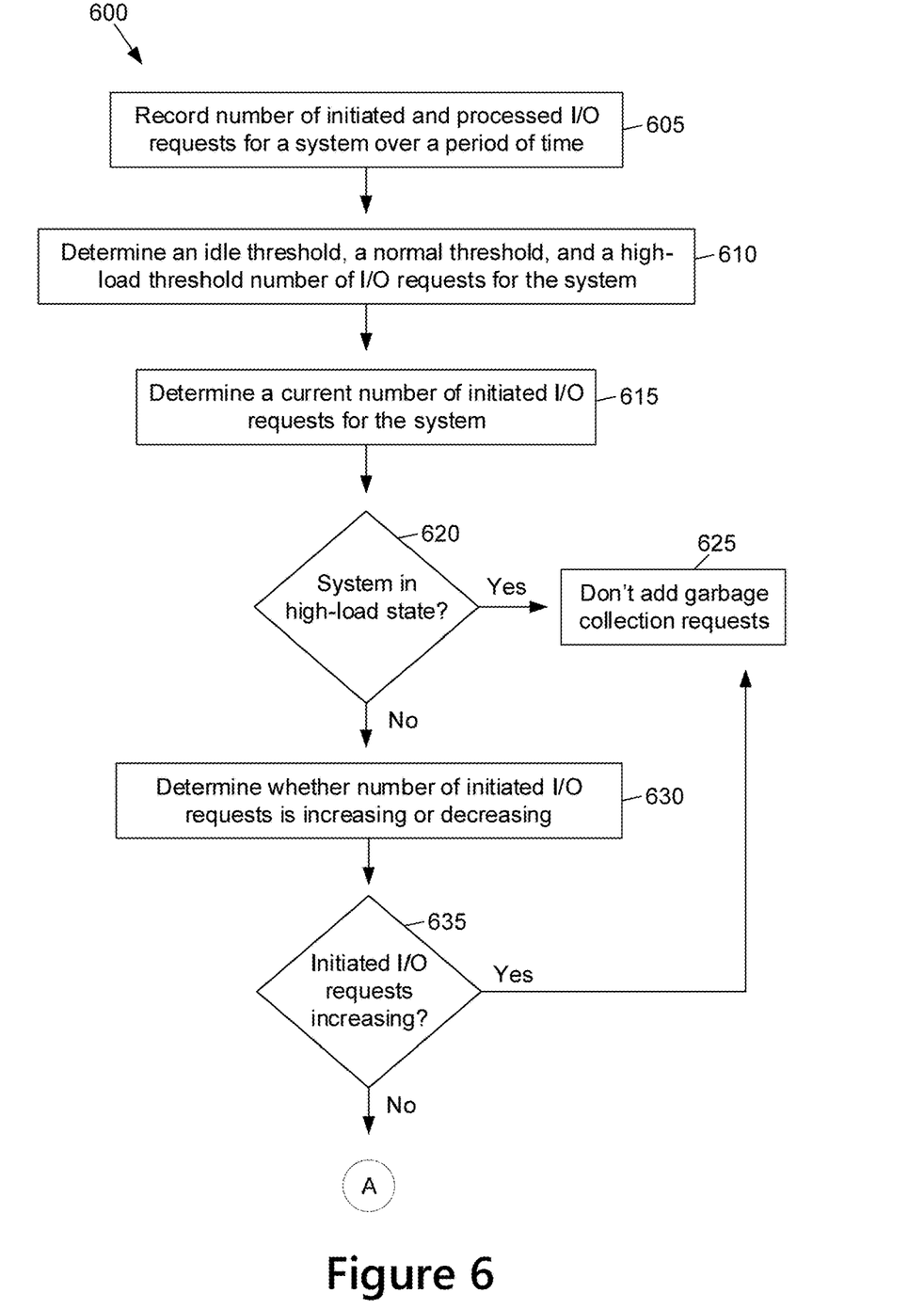
FIGS. 6 and 7 depict a flow diagram of a method for initiating garbage collection requests in accordance with non-limiting embodiments of the present technology.
Figure 7:
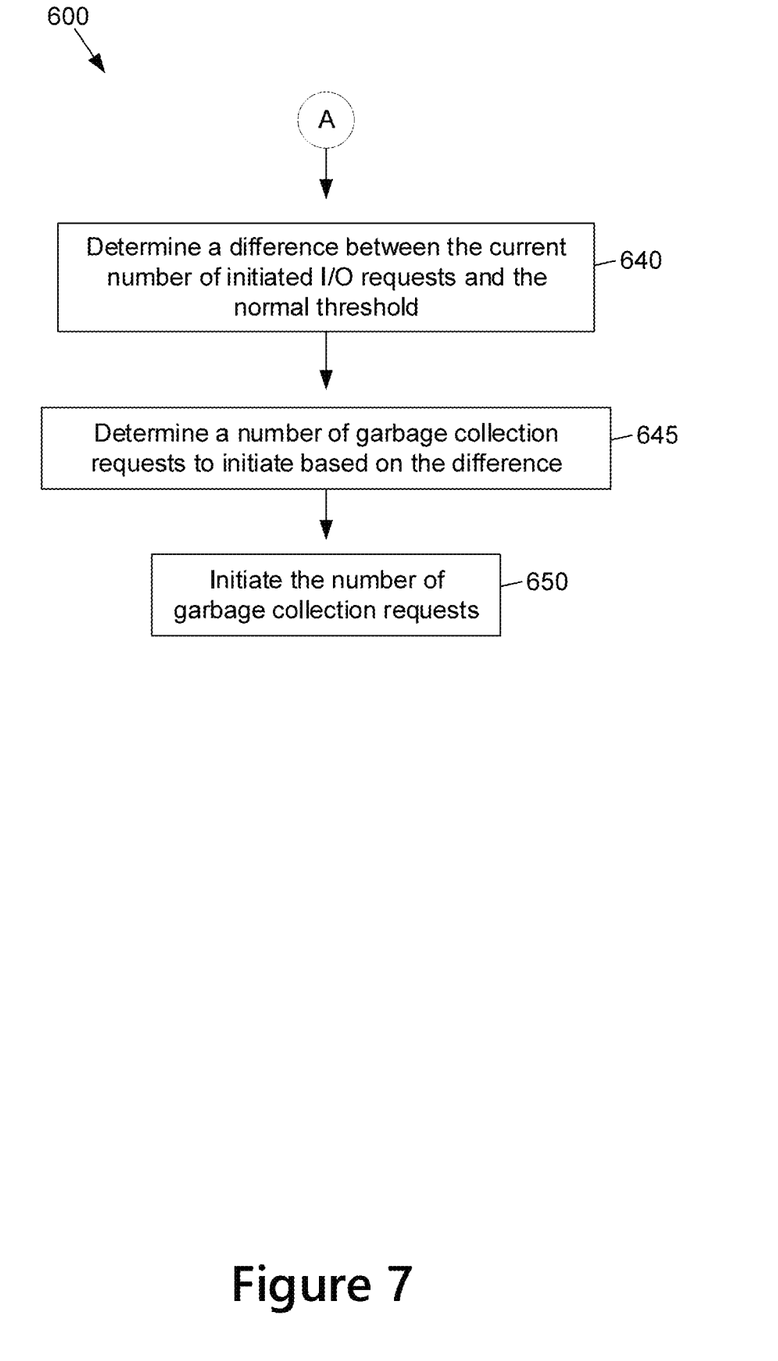

With reference to FIGS. 6-7, there is depicted a flow chart of a method 600, the method 600 being implementable in accordance with non-limiting embodiments of the present technology. In one or more aspects, the method 600 or one or more steps thereof may be performed by a computing system, such as the computing device 100. The method 600 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order Step 605—Record I/O Request Data At step 605 I/O request data may be recorded over a period of time for a storage system. The I/O request data may be recorded, retrieved, and/or acquired. The data may be stored in a database and/or retrieved from the database. The data may be representative of a level of and/or number of initiated I/O requests to be processed by the storage system. The data may be representative of a level of and/or number of I/O requests that were processed by the storage system over a period of time. The I/O request data may include normal I/O requests and/or garbage collection I/O requests. The I/O request data may exclude garbage collection I/O requests.

Statistics regarding the I/O request data may be determined, such as mean number of I/O requests, median number of I/O requests, maximum number of I/O request, minimum number of I/O requests, etc. The number of initiated I/O requests and/or the number of processed I/O requests at various times may be determined. The I/O request data may be recorded over any period of time, such as a day, week, or month. The I/O request data may be recorded at any frequency, such as every thirty seconds, every hour, every day, every week, every month, and/or every year. The I/O request data may include actual data and/or estimated data.

The number of initiated I/O requests may be the number of I/O requests that are in a queue to be performed on the storage system. The number of processed I/O requests may be determined over a period of time. The number of I/O requests that were processed over a pre-determined period of time may be determined. For example if data is recorded every five seconds, the number of processed I/O requests may be the number of I/O requests that were processed during each five second period.

Step 610—Determine I/O Request Thresholds

At step 610 I/O request thresholds may be determined for the storage system. A first operational state and/or a second operational state of operation of the storage system may be determined. The first operational state and/or the second operational state may be expressed as an indication of a level of initiated I/O requests to be processed by the storage system.

Any number of states may be defined for the storage system. As an example only, three states can be defined: an idle state, a normal state, and a high-load state may be defined for the storage system. A threshold number of initiated and/or processed I/O requests may be determined for each state. The threshold number may correspond to normal I/O requests and/or garbage collection I/O requests.

An idle threshold may be determined for the idle state. If the current number of initiated I/O requests is below the idle threshold then the storage system may be determined to be in the idle state. A normal threshold may be determined for the normal state. If the current number of initiated I/O requests is above the idle threshold but below the normal threshold then the storage system may be determined to be in the normal state. A high-load threshold may be determined for the storage system. If the current number of initiated I/O requests is above the normal threshold but below the high-load threshold then the storage system may be determined to be in the high-load state. In some instances a high-load threshold might not be determined. Instead, if the current number of initiated I/O requests is above the normal threshold then the storage system may be determined to be in the high-load state.

The thresholds may be determined using any suitable technique. A maximum number of recorded initiated and/or processed I/O requests may be determined. The thresholds may then be determined as a percentage of the determined maximum initiated and/or processed I/O requests. For example the idle threshold may be 33% of the maximum initiated I/O requests, the normal threshold may be 66% of the maximum initiated I/O requests, and the high-load threshold may be equal to the maximum number of initiated I/O requests. The thresholds may be determined based on an average amount of initiated I/O requests and/or an average amount of processed I/O requests for the storage system.

Step 615—Determine a Current Number of Initiated I/O Requests

At step 615 a current number of initiated I/O requests may be determined for the storage system. The initiated I/O requests may be requests that have been requested but have not yet been performed. The I/O requests can include any data operations, such as read, write, and/or erase operations. The I/O requests may be maintained in a queue, and the number of I/O requests may be determined.

The number of initiated I/O requests may be stored with an associated timestamp. The number of initiated I/O requests and the timestamp may be stored in a database. The determined number of initiated I/O requests may exclude garbage collection I/O requests.

Step 620—Determine Whether Storage System is in the High-Load State

At step 620 a determination may be made as to whether the storage system is in a high-load state. The current number of initiated I/O requests determined at step 615 may be compared to the high-load threshold. If the current number of initiated I/O requests is above the high-load threshold, then the storage system may be determined to be in the high-load state. If the storage system is determined to be in the high-load state, the method 600 continues to step 625. Otherwise, if the storage system is determined to not be in the high-load state, the method 600 continues to step 630.

Step 625—Don't Add Garbage Collection Requests

At step 625 garbage collection I/O requests might not be initiated. Additional garbage collection I/O requests might not be added to the queue for the storage system. Garbage collection I/O requests might not be initiated until the storage system is no longer in the high-load state. The method 600 may be executed periodically and/or after the storage system changes states. For example the method 600 may be executed every five seconds. If, during the next execution of the method 600, the storage system is in the idle or normal state then garbage collection I/O requests may be initiated at that time.

Steps 630 and 635—Determine Whether the Number of Initiated I/O Requests is Increasing or Decreasing At step 630 a determination may be made as to whether the number of initiated I/O requests is increasing or decreasing. A trend may be determined in the number of currently initiated I/O requests. The number of initiated I/O requests may be compared to a previously recorded number of initiated I/O requests. The number of initiated I/O requests may be recorded each time the method 600 is executed at step 615. The number of initiated I/O requests may be recorded periodically, such as every 5 seconds. A trend for the number of processed I/O requests may also be determined. A determination may be made as to whether the number of processed I/O requests is increasing or decreasing.

At 635 a decision may be made based on whether the number of initiated I/O requests and/or processed I/O requests is increasing or decreasing. If the number of initiated I/O requests is increasing, the method 600 may continue to step 625. If the number of initiated I/O requests is decreasing and/or remaining constant, the method 600 may continue to step 640.

Step 640—Determine a Difference Between Initiated I/O Requests and Normal Threshold At step 640 a difference between the current number of initiated I/O requests and the normal threshold may be determined. The current number of initiated I/O requests may have been determined at step 615. The normal threshold may have been determined at step 610. The difference may be calculated between the current number of initiated I/O requests and any other threshold or number. For example the difference may be calculated between the maximum number of recorded processed I/O requests and the number of initiated I/O requests.

Step 645—Determine a Number of Garbage Collection I/O Requests to Initiate

At step 645 a number of garbage collection I/O requests to initiate may be determined. The number of garbage collection I/O requests to initiate may be determined based on the difference determined at step 640. The number of garbage collection I/O requests to initiate may be equal to the difference determined at step 640. The number of garbage collection I/O requests to initiate may be less than the difference determined at step 640, such as five percent less than the difference.

Whether or not the garbage collection I/O requests will be initiated may be determined based on the operational state of the storage system. The storage system may be determined to be in a first operational state or a second operational state. The first operational state may be indicative of a lower number of initiated I/O requests than the second operational state. The first operational state may encompass the idle threshold and the normal threshold. The second operational state may encompass the high-load threshold. If the storage system is in the first operational state, garbage collection I/O requests may be initiated. If the storage system is in the second operational state, garbage collection I/O requests might not be initiated.

Step 650—Initiate the Number of Garbage Collection I/O Requests

At step 650 the number of garbage collection I/O requests may be initiated. The garbage collection I/O requests may include read, write, erase, and/or other I/O operations. The garbage collection I/O requests may consolidate valid pages from blocks that include both valid pages and invalid pages, and then those blocks may be erased.

The garbage collection I/O requests may include an instruction to erase a block of the storage system, such as a NAND flash block of the storage system or a zone of an SMR HDD. The block to erase may be pre-determined, such as by an algorithm for identifying blocks to erase. The algorithm may identify blocks that contain invalid pages.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be used as examples rather than limiting. The scope of the present technology is therefore intended to be limited solely by the scope of the appended claims.

The invention claimed is:

1. A system comprising:

at least one processor, and memory storing a plurality of executable instructions which, when executed by the at least one processor, cause the system to:

acquire historical data representative of an amount of initiated I/O requests, excluding garbage collection requests, to be processed by the system over a pre-determined period of time;

determine, based on the historical data, a maximum number of initiated I/O requests;

determine, based on the historical data, an average number of initiated I/O requests over the pre-determined period of time;

determine, based on the average number of initiated I/O requests, a normal state threshold number of initiated I/O requests;

determine, based on the maximum number of initiated I/O requests, a high-load state threshold number of initiated I/O requests corresponding to a high-load state, wherein the high-load state threshold number is higher than the normal state threshold number;

acquire a number of currently initiated I/O requests, excluding garbage collection requests, to be processed by the system;

determine that the number of currently initiated I/O requests is lower than the high-load state threshold number;

after determining that the number of currently initiated I/O requests is lower than the high-load state threshold number, determine a difference between the number of currently initiated I/O requests and the normal state threshold number; and initiate an amount of garbage collection requests equal to the difference between the number of currently initiated I/O requests and the normal state threshold number.

2. The system of claim 1, wherein the instructions cause the system to determine a trend in the number of currently initiated I/O requests to be processed by the system.

3. The system of claim 2, wherein the instructions cause the system to determine whether to initiate the garbage collection requests based on:
whether the number of initiated I/O requests is increasing or decreasing compared to a previously recorded number of initiated I/O requests; and
whether the number of processed I/O requests is increasing or decreasing compared to a previously recorded number of processed requests.

4. The system of claim 1, wherein the garbage collection requests comprise an instruction to erase at least one pre-determined NAND flash block of the system.

5. A method for determining an amount of garbage collection requests to be initiated by a computer system, the method executable by an electronic device associated with the computer system, the method comprising:
acquiring historical data representative of an amount of initiated I/O requests, excluding garbage collection requests, to be processed by the computer system over a pre-determined period of time;
determining, based on the historical data, a maximum number of initiated I/O requests;
determining, based on the historical data, an average number of initiated I/O requests over the pre-determined period of time;
determining, based on the average number of initiated I/O requests, a normal state threshold number of initiated I/O requests;
determining, based on the maximum number of initiated I/O requests, a high-load state threshold number of initiated I/O requests corresponding to a high-load state, wherein the high-load state threshold number is higher than the normal state threshold number;
acquiring a number of currently initiated I/O requests, excluding garbage collection requests, to be processed by the computer system;
determining that the number of currently initiated I/O requests is lower than the high-load state threshold number;
after determining that the number of currently initiated I/O requests is lower than the high-load state threshold number, determining a difference between the number of currently initiated I/O requests and the normal state threshold number; and
initiating an amount of garbage collection requests equal to the difference between the number of currently initiated I/O requests and the normal state threshold number.

6. The method of claim 5, wherein determining the normal state threshold number comprises applying a pre-determined percentage to the average number of initiated I/O requests.

7. The method of claim 5 wherein the method further comprises determining a trend in the number of currently initiated I/O requests to be processed by the computer system.

8. The method of claim 7, wherein the method further comprises determining whether to initiate the garbage collection requests based on:
whether the number of initiated I/O requests is increasing or decreasing compared to a previously recorded number of initiated I/O requests; and
whether the number of processed I/O requests is increasing or decreasing compared to a previously recorded number of processed requests.

9. The method of claim 5, wherein the computer system comprises at least one computer sub-system, the at least one sub-system being one of a shingled magnetic recording hard drive device (SMR HDD), solid-state drive (SSD), flash translation layer (FTL), or a file system.

10. The method of claim 5, wherein the garbage collection requests comprises an instruction to erase at least one pre-determined NAND flash block of the computer system.

11. The method of claim 10, further comprising applying a pre-determined algorithm for identifying the at least one pre-determined NAND flash block.

12. A non-transitory computer-readable medium comprising a plurality of executable instructions which, when executed by at least one processor, cause the at least one processor to:
acquire historical data representative of an amount of initiated I/O requests, excluding garbage collection requests, to be processed by a system over a pre-determined period of time;
determine, based on the historical data, a maximum number of initiated I/O requests;
determine, based on the historical data, an average number of initiated I/O requests over the pre-determined period of time;
determine, based on the average number of initiated I/O requests, a normal state threshold number of initiated I/O requests;
determine, based on the maximum number of initiated I/O requests, a high-load state threshold number of initiated I/O requests corresponding to a high-load state, wherein the high-load state threshold number is higher than the normal state threshold number;
acquire a number of currently initiated I/O requests, excluding garbage collection requests, to be processed by the system;
determine that the number of currently initiated I/O requests is lower than the high-load state threshold number;
after determining that the number of currently initiated I/O requests is lower than the high-load state threshold number, determine a difference between the number of currently initiated I/O requests and the normal state threshold number; and
initiate an amount of garbage collection requests equal to the difference between the number of currently initiated I/O requests and the normal state threshold number.

* * * * *